United States Patent
Okamoto

(10) Patent No.: US 9,946,813 B2
(45) Date of Patent: Apr. 17, 2018

(54) COMPUTER-READABLE RECORDING MEDIUM, SEARCH SUPPORT METHOD, SEARCH SUPPORT APPARATUS, AND RESPONDING METHOD

(71) Applicant: FUJITSU LIMITED, Kawasaki-shi, Kanagawa (JP)

(72) Inventor: Miki Okamoto, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 14/739,835

(22) Filed: Jun. 15, 2015

(65) Prior Publication Data

US 2016/0042060 A1    Feb. 11, 2016

(30) Foreign Application Priority Data

Aug. 8, 2014  (JP) ................. 2014-162702

(51) Int. Cl.
G06F 17/30    (2006.01)

(52) U.S. Cl.
CPC .. *G06F 17/30991* (2013.01); *G06F 17/30976* (2013.01)

(58) Field of Classification Search
None
See application file for complete search history.

(56) References Cited

U.S. PATENT DOCUMENTS

| | | | | |
|---|---|---|---|---|
| 7,930,319 B2* | 4/2011 | Zhang | ............... | G06F 17/30734 707/802 |
| 7,962,466 B2* | 6/2011 | Jones | ............... | G06F 17/30864 707/706 |
| 2004/0049499 A1* | 3/2004 | Nomoto | ............ | G06F 17/30654 |
| 2005/0114327 A1* | 5/2005 | Kumamoto | ....... | G06F 17/30684 |
| 2006/0206472 A1* | 9/2006 | Masuichi | ............. | G06F 17/2785 |
| 2007/0136246 A1* | 6/2007 | Stenchikova | ......... | G06F 17/279 |
| 2008/0294637 A1* | 11/2008 | Liu | ................... | G06F 17/30861 |
| 2009/0287678 A1* | 11/2009 | Brown | ............. | G06F 17/30654 |
| 2010/0262599 A1* | 10/2010 | Nitz | .................... | G06F 17/3087 707/723 |
| 2010/0332499 A1* | 12/2010 | Pan | ..................... | G06F 17/3053 707/759 |
| 2011/0125734 A1* | 5/2011 | Duboue | .................. | G09B 7/00 707/723 |
| 2012/0095982 A1* | 4/2012 | Lennington | ....... | G06F 17/30247 707/706 |
| 2012/0101807 A1* | 4/2012 | Heo | .................. | G06F 17/30657 704/9 |

(Continued)

FOREIGN PATENT DOCUMENTS

| | | |
|---|---|---|
| JP | 11-232305 | 8/1999 |
| JP | 2006-119697 | 5/2006 |

*Primary Examiner* — Hung Le
(74) *Attorney, Agent, or Firm* — Fujitsu Patent Center

(57) ABSTRACT

A search support apparatus includes a receiving unit, a determining unit, and an output unit. The receiving unit receives a question containing a character string and extracts a keyword for specifying a question object and a keyword for specifying a question type from the character string contained in the question. The determining unit determines a display mode of an output of a response to the received question in accordance with the keyword for specifying the question type. The output unit outputs a search result based on the keyword for specifying the question object, in the display mode of the output.

15 Claims, 17 Drawing Sheets

(56) References Cited

U.S. PATENT DOCUMENTS

| | | | |
|---|---|---|---|
| 2013/0226844 A1* | 8/2013 | Zhang | G06N 5/04 706/12 |
| 2014/0012787 A1* | 1/2014 | Zhang | G06N 5/02 706/12 |
| 2014/0149446 A1* | 5/2014 | Kuchmann-Beauger | G06F 17/30389 707/763 |
| 2014/0222743 A1* | 8/2014 | Baughman | G06N 5/02 706/46 |
| 2014/0250134 A1* | 9/2014 | Jones | G06F 17/3053 707/748 |
| 2014/0280144 A1* | 9/2014 | Heit | G06F 17/30598 707/737 |
| 2014/0358890 A1* | 12/2014 | Chen | G06F 17/30654 707/710 |
| 2015/0026163 A1* | 1/2015 | Haggar | G06F 17/3053 707/723 |
| 2015/0066479 A1* | 3/2015 | Pasupalak | G06F 17/27 704/9 |
| 2015/0186528 A1* | 7/2015 | Rao | G06F 17/30867 707/710 |
| 2017/0228367 A1* | 8/2017 | Pasupalak | G06F 17/279 |

* cited by examiner

| IDENTIFI-CATION NUMBER | QUESTION PHRASE | QUESTION TYPE | OUTPUT PATTERN |
|---|---|---|---|
| 1 | () ARIMASUKA? | WhatA | A) IMAGE + NOUN |
| 2 | () DE () NANO WA DOREDESUKA? | WhatA | A) IMAGE + NOUN |
| 23 | () JI NI DOUSHITEMASUKA? | WhatB | B) VERB + NOUN |
| 24 | () NI TOTTE () WA DONNA () DESUKA? | WhatB | B) VERB + NOUN |
| 42 | () WA ITSU ()? | When | C) DATE FILTER |
| 43 | () KUNI WA DOKODESHITAKA? | Where | D) NOUN INDICATING PLACE |
| 44 | () WA DOKODE () MASUKA? | Where | D) NOUN INDICATING PLACE |
| 47 | () TO () DOCHIRA GA () DESUKA? | Which | E) COMPARISON |
| 48 | () TO () DOCHIRA GA () TO OMOIMASUKA? | Which | E) COMPARISON |
| 51 | (), NANTANI GA () TO OMOIMASUKA? | Filter | F) UNIT FILTER |
| 53 | () WA DOREKURAIDESUKA? | Filter | F) UNIT FILTER |
| 61 | () GA () DESUKA? | Yes/No | NG |
| 62 | () TO OMOIMASUKA? | Yes/No | NG |
| 71 | DOUSHITE () GA () DESUKA? | Why | NG |
| 72 | () WA DOU OMOTTEIMASUKA? | How Feel | NG |
| 74 | DONOYOUNA () GA () TO OMOIMASUKA? | How Feel | NG |

| IDENTIFI-CATION NUMBER | QUESTION PHRASE | QUESTION TYPE | OUTPUT PATTERN |
|---|---|---|---|
| 1 | Is there () ? | WhatA | A) IMAGE + NOUN |
| 2 | Which is () ? | WhatA | A) IMAGE + NOUN |
| 23 | What do you (v) when () ? | WhatB | B) VERB + NOUN |
| 24 | What () is () for () ? | WhatB | B) VERB + NOUN |
| 42 | When do you (v) () ? | When | C) DATE FILTER |
| 43 | Where is the () country? | Where | D) NOUN INDICATING PLACE |
| 44 | Where do you (v) () ? | Where | D) NOUN INDICATING PLACE |
| 47 | Which is (), A or B ? | Which | E) COMPARISON |
| 48 | Which do you think (), A or B ? | Which | E) COMPARISON |
| 51 | When (), how () do you think () ? | Filter | F) UNIT FILTER |
| 53 | How often do you (v) ?/ How much is (n) ? | Filter | F) UNIT FILTER |
| 61 | Do you (v) for () ? | Yes/No | NG |
| 62 | Do you think that it is () ? | Yes/No | NG |
| 71 | Why is (n) () ? | Why | NG |
| 72 | What do you think of () ? | How Feel | NG |
| 74 | What kind of () do you think () ? | How Feel | NG |
| ... | | | |

FIG.3A

| IDENTIFI-CATION NUMBER | QUESTION PHRASE | QUESTION TYPE | OUTPUT PATTERN | EXTRACTION RULE |
|---|---|---|---|---|
| 1 | ( ) ARIMASUKA? | WhatA | A) IMAGE + NOUN | NOUN BEFORE INTERROGATIVE |
| 2 | ( ) DE ( ) NANO WA DOREDESUKA? | WhatA | A) IMAGE + NOUN | NOUN BEFORE INTERROGATIVE |
| 3 | ( ) NANI? | WhatA | A) IMAGE + NOUN | NOUN AND VERB BEFORE INTERROGATIVE |
| 4 | ( ) NI DONNA ( ) WO ( ) MASUKA? | WhatA | A) IMAGE + NOUN | NOUN BEFORE INTERROGATIVE AND VERB AFTER INTERROGATIVE |
| 23 | ( ) JI NI DOUSHITEMASUKA? | WhatB | B) VERB + NOUN | NOUN AND VERB BEFORE INTERROGATIVE |
| 24 | ( ) NI TOTTE ( ) WA DONNA ( ) DESUKA? | WhatB | B) VERB + NOUN | NOUN BEFORE INTERROGATIVE AND VERB AFTER INTERROGATIVE |
| 25 | ( ) NI WA DOUSUREBA ( ) DESUKA? | WhatB | B) VERB + NOUN | NOUN AND VERB BEFORE INTERROGATIVE |
| 26 | ( ) NO DONNA TOKORO GA ( ) DESUKA? | WhatB | B) VERB + NOUN | NOUN OF INTERROGATIVE AND VERB AFTER INTERROGATIVE |
| 42 | ( ) WA ITSU ( )? | When | C) DATE FILTER | VERB BEFORE AND AFTER INTERROGATIVE |
| 43 | ( ) KUNI WA DOKODESHITAKA? | Where | D) NOUN INDICATING PLACE | NOUN BEFORE INTERROGATIVE |
| 44 | ( ) WA DOKODE ( ) MASUKA? | Where | D) NOUN INDICATING PLACE | NOUN BEFORE INTERROGATIVE AND VERB AFTER INTERROGATIVE |
| 45 | ( ) WA DOKODESUKA? | Where | D) NOUN INDICATING PLACE | NOUN BEFORE INTERROGATIVE |
| 46 | ( ) TO ( ) DE, DOCHIRAGA ( )? | Which | E) COMPARISON | NOUN BEFORE INTERROGATIVE AND VERB AFTER INTERROGATIVE |
| 47 | ( ) TO ( ) DOCHIRAGA ( ) DESUKA? | Which | E) COMPARISON | NOUN BEFORE INTERROGATIVE AND VERB AFTER INTERROGATIVE |
| 48 | ( ) TO ( ) DOCHIRAGA ( ) TO OMOIMASUKA? | Which | E) COMPARISON | NOUN BEFORE INTERROGATIVE AND VERB AFTER INTERROGATIVE |
| 49 | ( ) TO ( ) DOCHIRADESUKA? | Which | E) COMPARISON | NOUN BEFORE INTERROGATIVE |
| 50 | ( ) WA ( ) TO ( ) DE DOCHIRAGA ( ) DESUKA? | Which | E) COMPARISON | NOUN BEFORE INTERROGATIVE AND VERB AFTER INTERROGATIVE |
| 51 | ( ) NANTANI GA ( ) TO OMOIMASUKA? | Filter | F) UNIT FILTER | NOUN BEFORE INTERROGATIVE |
| 52 | ( ) WA DOREKURAIGOTONI ( ) MASUKA? | Filter | F) UNIT FILTER | NOUN BEFORE INTERROGATIVE AND VERB AFTER INTERROGATIVE |

FIG.3B

| IDENTIFI-CATION NUMBER | QUESTION PHRASE | QUESTION TYPE | OUTPUT PATTERN | EXTRACTION RULE |
|---|---|---|---|---|
| 1 | Is there () ? | WhatA | A) IMAGE + NOUN | the subject of this sentence |
| 2 | Which is () ? | WhatA | A) IMAGE + NOUN | noun after interrogative, "which" |
| 3 | What is () ? | WhatA | A) IMAGE + NOUN | noun after interrogative, "what" |
| 4 | What do you (v) in () ? | WhatB | B) VERB + NOUN | verb after interrogative, "what" |
| 23 | What do you (v) when () ? | WhatB | B) VERB + NOUN | verb after interrogative, "what" and phrase after the verb |
| 24 | What () is () for () ? | WhatB | B) VERB + NOUN | noun after interrogative, "what" and the subject of this sentence |
| 25 | What should I do to (v) () ? | WhatB | B) VERB + NOUN | verb after interrogative, "what" and phrase after the verb |
| 26 | What kind of () do you (v) about () ? | WhatB | B) VERB + NOUN | noun after "what kind of" and verb after "what kind of" |
| 42 | When do you (v) () ? | When | C) DATE FILTER | verb and object after interrogative, "when" |
| 43 | Where is the () country? | Where | D) NOUN INDICATING PLACE | noun after interrogative, "where" |
| 44 | Where do you (v) () ? | Where | D) NOUN INDICATING PLACE | the object of the verb after interrogative, "where" |
| 45 | Where is () ? | Where | D) NOUN INDICATING PLACE | noun after interrogative, "where" |
| 46 | Which is (), A or B ? | Which | E) COMPARISON | in case of interrogative "which", noun before "or" and noun after "or" |
| 47 | Which is (), A or B ? | Which | E) COMPARISON | in case of interrogative "which", noun before "or" and noun after "or" |
| 48 | Which do you think (), A or B ? | Which | E) COMPARISON | in case of interrogative "which", noun before "or" and noun after "or" |
| 49 | Which do you (v), A or B ? | Which | E) COMPARISON | in case of interrogative "which", noun before "or" and noun after "or" |
| 50 | Which is () for (), A or B ? | Which | E) COMPARISON | in case of interrogative "which", noun before "or" and noun after "or" |
| 51 | When (), how () do you think () ? | Filter | F) UNIT FILTER | phrase before "how ~do you think" |
| 52 | How often do you (v) ~? | Filter | F) UNIT FILTER | phrase after interrogative "How", including verb |

FIG.4

| USER IDENTIFICATION INFORMATION | ATTRIBUTE | ARTICLE | IMAGE |
|---|---|---|---|
| U101 | JUNIOR HIGH-SCHOOL STUDENT | UPLOADED ARTICLE INFORMATION | UPLOADED IMAGE INFORMATION |
| U102 | COLLEGE STUDENT | UPLOADED ARTICLE INFORMATION | UPLOADED IMAGE INFORMATION |
| U103 | MALE EMPLOYEE | UPLOADED ARTICLE INFORMATION | UPLOADED IMAGE INFORMATION |
| U104 | SENIOR | UPLOADED ARTICLE INFORMATION | UPLOADED IMAGE INFORMATION |
| U105 | COLLEGE STUDENT | UPLOADED ARTICLE INFORMATION | UPLOADED IMAGE INFORMATION |
| U106 | FEMALE EMPLOYEE | UPLOADED ARTICLE INFORMATION | UPLOADED IMAGE INFORMATION |
| U107 | HOUSEWIFE | UPLOADED ARTICLE INFORMATION | UPLOADED IMAGE INFORMATION |
| ... | | | |

FIG.11

| FILTER TYPE | SPECIFIC EXAMPLE OF FILTER | UNIT |
|---|---|---|
| PROBABILITY | RAINFALL PROBABILITY | %, RATE |
| MASS | BODY WEIGHT | kg, g, KILOGRAM, GRAM, TON |
| LENGTH | HEIGHT, DISTANCE | cm, m, km, CENTIMETER, METER, KILOMETER, INCH, MILE |
| AREA | LARGENESS | HECTARE, m² |
| VOLUME | AMOUNT OF BEVERAGE | LITER, l, ml, GO |
| SPEED | - | PER SECOND, PER MINUTE, PER HOUR (UNIT OF DISTANCE) |
| OSCILLATION/ WAVE | EARTHQUAKE INTENSITY | HERTZ, MAGNITUDE, DECIBEL |
| ENERGY | - | WATT, KILOWATT, HORSEPOWER |
| RADIATION | RADIATION DOSE | MILLISIEVERT, MICROSIEVERT, BECQUEREL |
| TEMPERATURE | AIR TEMPERATURE | °C, DEGREE |
| IMAGE INPUT/ OUTPUT | - | PIXEL, DOT, dpi |
| INFORMATION/ COMMUNICATION | - | BIT, BYTE, GB, GIGABYTE, MEGABYTE |
| AMOUNT | - | BOOK, COPY, PACKAGE, LOT, BOX, SHEET, PART, MARK, VOLUME, FEET, SET, ODD, FLOOR, PIECE, SCALE, SACK, BOWL, DIVISION, TAIL, STRETCH, HOUSE, CUP, BODY, PAIR, LEG, STOCK, BUNDLE, HEAD, WING, WARD, SEAT, ROLL, ISSUE, DOOR, STATION, GROUP, AXIS, COMPANY, GUEST, BUILDING, FACET, LINE, THREAD, NUMBER, SWEEP, DRAPE, UNIT, REAM, BURL, FRACTION, SUBJECT, ROW, BRANCH, LEAF, BOTTLE, ... |
| NUMBER OF TIMES | - | FREQUENCY, DEGREE |
| TIME | PERIOD, TIME, FREQUENCY | YEAR, MONTH, WEEK, DAYS, TIME, MINUTE, SECOND |
| MONEY AMOUNT | ALLOWANCE | YEN, DOLLAR, EURO |

…

COMPUTER-READABLE RECORDING MEDIUM, SEARCH SUPPORT METHOD, SEARCH SUPPORT APPARATUS, AND RESPONDING METHOD

CROSS-REFERENCE TO RELATED APPLICATION(S)

This application is based upon and claims the benefit of priority of the prior Japanese Patent Application No. 2014-162702, filed on Aug. 8, 2014, the entire contents of which are incorporated herein by reference.

FIELD

The embodiment discussed herein is directed to a computer-readable recording medium or the like.

BACKGROUND

For example, there is a known conventional search system that, upon receiving a question sentence from a user by displaying a search screen, analyzes the question sentence, extracts keywords contained in the question sentence, and searches for information corresponding to the extracted keywords. In the conventional technology, images, blog articles, or the like associated with the keywords contained in the question sentence are searched for, and retrieved images, blog articles, or the like are displayed.

Patent Literature 1: Japanese Laid-open Patent Publication No. 2006-119697
Patent Literature 2: Japanese Laid-open Patent Publication No. 11-232305

However, in the conventional technology as described above, it is difficult to return a response in a mode corresponding to a question sentence.

For example, in the conventional technology, when a question sentence is received, images, blog articles, or the like associated with keywords contained in the question sentence are only displayed, and it is impossible to return a response in a mode corresponding to the question sentence; therefore, it is difficult to display information requested by a user.

SUMMARY

According to an aspect of an embodiment, a non-transitory computer-readable recording medium has stored therein a program that causes a computer to execute a process including receiving a question containing a character string; extracting a keyword for specifying a question object and a keyword for specifying a question type from the character string contained in the question; determining a display mode of an output of a response to the received question in accordance with the keyword for specifying the question type; and outputting a search result based on the keyword for specifying the question object, in the display mode of the output.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram illustrating a first example of a data structure of a question phrase dictionary;
FIG. 2B is a diagram illustrating a second example of the data structure of the question phrase dictionary;
FIG. 3A is a diagram illustrating a first example of a data structure of extraction rule information;
FIG. 3B is a diagram illustrating a second example of the data structure of the extraction rule information;
FIG. 4 is a diagram illustrating an example of a data structure of a DB;
FIG. 11 is a diagram illustrating an example of various units.

DESCRIPTION OF EMBODIMENTS

Preferred embodiments of the present invention will be explained with reference to accompanying drawings. The disclosed technology is not limited to the embodiments below.

Figure 1:
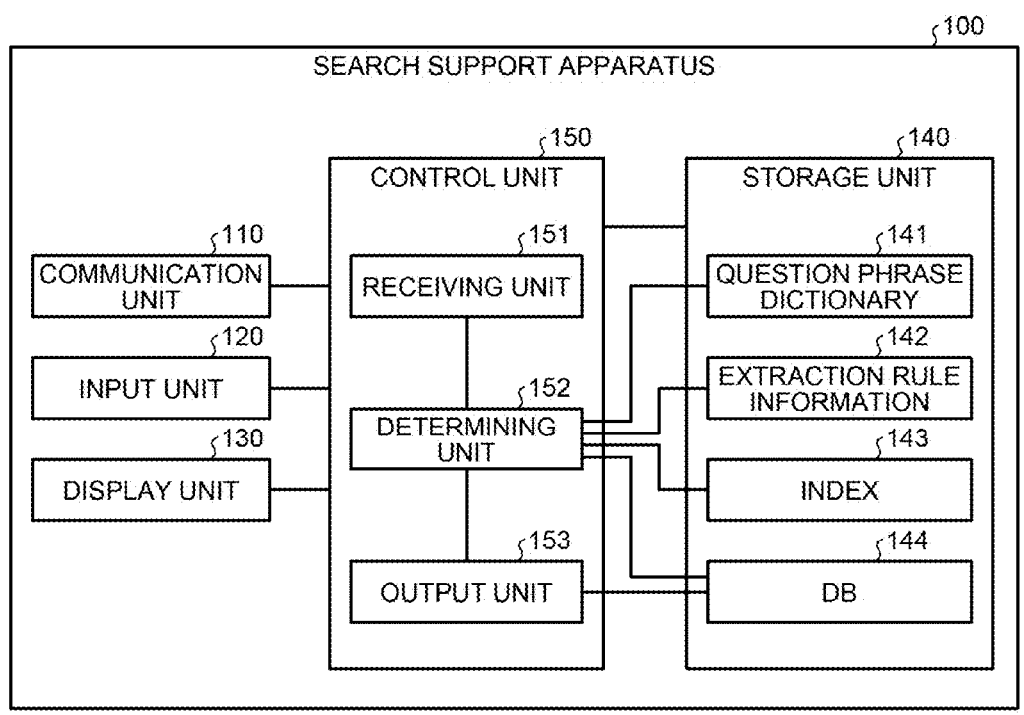
FIG. 1 is a functional block diagram illustrating a configuration of a search support apparatus according to an embodiment.

A configuration of a search support apparatus according to an embodiment will be described. FIG. 1 is a functional block diagram illustrating a configuration of a search support apparatus according to an embodiment. As illustrated in FIG. 1, a search support apparatus 100 includes a communication unit 110, an input unit 120, a display unit 130, a storage unit 140, and a control unit 150.

The communication unit 110 is a processing unit that performs data communication with other devices via a network. For example, the communication unit 110 corresponds to a communication device or the like. For example, upon receiving information on a question sentence, the communication unit 110 outputs the received information on the question sentence to the control unit 150.

The input unit 120 is an input device that inputs various kinds of information, such as information on a question sentence, to the search support apparatus 100. The input unit 120 corresponds to a keyboard, a mouse, a touch panel, or the like.

The display unit 130 is a display device that displays various kinds of data output by the control unit 150. For example, the display unit 130 corresponds to a liquid crystal display, a touch panel, or the like.

The storage unit 140 includes a question phrase dictionary 141, extraction rule information 142, an index 143, and a database (DB) 144. The storage unit 140 corresponds to a storage device, such as a semiconductor memory element including a random access memory (RAM), a read only memory (ROM), a flash memory, or the like.

The question phrase dictionary 141 is a storage area for storing data that defines a question type and an output pattern of a phrase of a question sentence. FIG. 2A and FIG. 2B are diagrams illustrating examples of a data structure of the question phrase dictionary. FIG. 2A illustrates an example in which Japanese question phrases are stored. FIG. 2B illustrates an example in which English question phrases are stored. As illustrated in FIG. 2A and FIG. 2B, in the question phrase dictionary 141, an identification number, a question phrase, a question type, and an output pattern are associated with one another.

In FIG. 2A and FIG. 2B, the identification number is information for uniquely identifying a set of the question phrase, the question type, and the output pattern. The question phrase indicates an example of a basic phrase of a question sentence. ( ) in the question phrase indicates an arbitrary character string.

The question type defines a type of a question sentence. For example, the question type includes "WhatA", "WhatB", "When", "Where", "Which", "Filter", "Yes/No", "Why", and "How Feel".

The question type of "WhatA" is a question type assigned to a question sentence that asks an object. For example, a question sentence of "What did you give as a gift for daughter's birthday?" is a question sentence that asks an object, and therefore is classified into the question type of "WhatA".

A question type of "WhatB" is a question type assigned to a question sentence that asks a verb. For example, a question sentence of "What did you do for $10^{th}$ wedding anniversary?" is a question sentence that asks a verb, and therefore is classified into the question type of "WhatB".

A question type of "When" is a question type assigned to a question sentence that asks information on a date. For example, a question sentence of "When do you put away kotatsu?" is a question sentence that asks information on a date, and therefore is classified into the question type of "When".

A question type of "Where" is a question type assigned to a question sentence that asks a place. For example, a question sentence of "Where did you go for first trip abroad?" is a question sentence that asks a place, and therefore is classified into the question type of "Where".

A question type of "Which" is a question type assigned to a question sentence that asks for comparison. For example, a question sentence of "Which do you like better, omelet or rice omelet?" is a question sentence that asks for comparison, and therefore is classified into the question type of "Which".

A question type of "Filter" is a question type assigned to a question sentence that asks a size. For example, a question sentence of "What would be an ideal height for women in centimeters (cm)?" is a question sentence that asks a size, and therefore is classified into the question type of "Filter".

Other question types of "Yes/No", "Why", and "How Feel" are question types assigned to question sentences other than those of the above described question types. Explanation of the question types of "Yes/No", "Why", and "How Feel" will be omitted.

The output pattern defines a display mode of a search result. For example, an output pattern of "image+noun" is to output both of a related image and a related noun contained in a search result. An output pattern of "verb+noun" is to output both of a related verb and a related noun contained in a search result.

An output pattern of "date filter" is to output a date contained in a search result. An output pattern of "noun indicating place" is to output a noun indicating a place contained in a search result. An output pattern of "comparison" is to output a result of comparison between, for example, the number of articles containing a certain noun to be a comparison object and the number of articles containing a different noun to be a comparison object, among articles contained in a blog or the like. For another example, the output pattern of "comparison" is to output a graph that enables comparison between the number of users who publish the articles containing the certain noun and the number of users who publish the articles containing the different noun. An output pattern of "unit filter" is to output a value accompanied by a unit contained in a search result.

In the examples in FIG. 2A and FIG. 2B, one type of an output pattern is stored as a content of the output pattern defined for each question type; however, it is not limited thereto. For example, it may be possible to store a plurality of types of output patterns as contents of the output pattern. For example, it may be possible to store, as output patterns for the question type of "WhatA", a pattern for displaying a ranking of appearance frequencies of a plurality of nouns, a pattern for displaying a graph of the occurrence rate of the same (or similar) noun with respect to a parameter, and the like, rather than "image+noun".

Referring back to FIG. 1, the extraction rule information 142 is a storage area for storing data that defines an extraction method of extracting a search query from a question sentence. FIG. 3A and FIG. 3B are diagrams illustrating examples of a data structure of the extraction rule information. FIG. 3A illustrates an example in which Japanese question phrases and extraction rules are stored. FIG. 3B illustrates an example in which English question phrases and extraction rules are stored. As illustrated in FIG. 3A and FIG. 3B, in the extraction rule information 142, an identification number, a question phrase, a question type, an output pattern, and an extraction rule are associated with one another.

In FIG. 3A and FIG. 3B, the identification number is information for uniquely identifying a set of the question phrase, the question type, the output pattern, and the extraction rule. Explanation of the question phrase, the question type, and the output pattern is the same as the explanation of the question phrase, the question type, and the output pattern described above with reference to FIG. 2A and FIG. 2B. Further, as described in the explanation of the output pattern in FIG. 2A and FIG. 2B, even in FIG. 3A and FIG. 3B, a plurality of types of output patterns may be defined for one type of the question type.

The extraction rule indicates which part of a question sentence is extracted as a search query. For example, if a question sentence corresponds to an identification number of "1", and when Japanese is used, a noun before an interrogative is extracted as a search query as illustrated in FIG. 3A. A part of a question sentence to be particularly extracted as a search query varies according to a difference in syntax depending on languages; however, it is sufficient that an extraction rule for extracting, as an extraction object, a portion corresponding to a question object is stored.

The index 143 is a storage area for storing information on an index corresponding to the DB 144. For example, in the index 143, an article or writing contained in the DB 144 or a part of a character string or the like associated with an image is used as an index, and the index and a location of information corresponding to the index in the DB 144 are associated with each other.

The DB 144 is a storage area for storing information on an article or a photograph uploaded by various users. The DB 144 stores therein pieces of information published on the Web by a plurality of users. Alternatively, the DB 144 stores therein pieces of information on addresses or the like to access information published on the Web by a plurality of users. The pieces of the information are stored through a preparation process before the search support apparatus 100 performs a process illustrated in a flowchart in FIG. 12 to be described later. For example, the search support apparatus 100 or a different computer may collect and store pieces of information on a blog published by a predetermined user at regular intervals or at a timing of receiving an instruction.

The attribute indicates an attribute of a user. For example, a user is classified into a junior high-school student, a college student, a male employee, a female employee, a senior, a housewife, or the like. The article is article information uploaded on a blog or the like by the user. The image is image information uploaded on a blog or the like by the user.

The control unit 150 includes a receiving unit 151, a determining unit 152, and an output unit 153. The control unit 150 corresponds to an integrated device, such as an application specific integrated circuit (ASIC) or a field programmable gate array (FPGA). The control unit 150 corresponds to an electronic circuit, such as a central processing unit (CPU) or a micro processing unit (MPU).

The receiving unit 151 is a processing unit that receives information on a question sentence from the communication unit 110 or the input unit 120. The receiving unit 151 outputs the information on the question sentence to the determining unit 152. The receiving unit 151 may display an input screen for inputting a question sentence on the display unit 130, allow a question sentence to be input in an input form on the input screen, and receive information on the question sentence.

The determining unit 152 determines a search query, a question type, and an output pattern from a character string contained in a question sentence on the basis of the information on the question sentence, the question phrase dictionary 141, and the extraction rule information 142. The determining unit 152 searches through the DB 144 by using the search query. The determining unit 152 outputs the output pattern and a search result to the output unit 153.

An example of a process of determining a question type and an output pattern by the determining unit 152 will be described. The determining unit 152 compares a character string in a question sentence and a question phrase in the question phrase dictionary 141, and determines whether a question phrase corresponding to the question sentence is present. When the question phrase corresponding to the question sentence is present, the determining unit 152 specifies a question type and an output pattern corresponding to the question sentence.

For example, if a character string in the question sentence is "Lunch no oishii omise wa arimasuka?", the character string corresponds to a question phrase with the identification number of "1" in the question phrase dictionary 141 illustrated in FIG. 2A. Therefore, the determining unit 152 determines a question type of the question sentence of "Lunch no oishii omise wa arimasuka?" as "WhatA" and determines the output pattern as "image+noun".

In contrast, if a question phrase corresponding to the question sentence is absent, the determining unit 152 outputs information on an error screen on the display unit 130. Further, even when a question phrase corresponding to the question sentence is present, if the question type corresponding to the question sentence is "Yes/No", "Why", or "How Feel", the determining unit 152 outputs information on an error screen on the display unit 130.

An example of a process of determining a search query by the determining unit 152 will be described. After determining the question type through the process as described above, the determining unit 152 compares the determined question type and the extraction rule information 142, and determines an extraction rule. The determining unit 152 extracts a search query from a character string in the question sentence in accordance with the determined extraction rule. In the following description, a candidate for the search query will be described as a candidate search query.

For example, as illustrated in FIG. 3A, when the question type is "WhatA", the extraction rule is "noun before interrogative". For example, when a question sentence is "Lunch no oishii omise wa arimasuka?", the determining unit 152 extracts a noun of "Lunch no oishii omise" located before "arimasuka" as a candidate search query.

While a single candidate search query is described above as an example, if a plurality of candidate search queries are extracted by the extraction rule, the determining unit 152 may perform a search by using the candidate search queries.

After extracting the candidate search query, the determining unit 152 evaluates the extracted candidate search query. For example, the determining unit 152 compares the candidate search query and the index 143, and specifies the number of hits by the candidate search query. If the number of hits is equal to or greater than a predetermined threshold, the determining unit 152 specifies the candidate search query as a search query.

In contrast, if the number of hits by the candidate search query is smaller than the predetermined threshold, the determining unit 152 corrects the candidate search query. The determining unit 152 compares the corrected candidate search query and the index 143, and specifies the number of hits again. The determining unit 152 repeats the above described process until the number of hits becomes equal to or greater than the predetermined threshold.

An example of a process of correcting a candidate search query by the determining unit 152 will be described. For example, when a candidate search query contains a plurality of nouns, the determining unit 152 may correct the candidate search query by deleting some of the nouns.

For example, the determining unit 152 performs correction by deleting some of the nouns from the candidate search query of "Lunch no oishii omise" to generate a new search query of "oishii omise", and specifies the number of hits again by using the generated candidate search query.

Alternatively, when a plurality of candidate search queries are extracted, the determining unit 152 may delete some of the candidate search queries, and perform a search by using the remaining candidate search queries.

The determining unit 152 determines a search query, and thereafter performs a search by using the determined search query. For example, the determining unit 152 compares the search query and the index 143, and specifies a location of information in the DB 144 in which information corresponding to the search query is located. The determining unit 152 extracts, as a search result, data of an article, writing, or an image indicated by the information stored in the specified location. The determining unit 152 outputs the search result and the output pattern to the output unit 153.

The output unit 153 is a processing unit that outputs the search result in a display mode of the output pattern. For example, the output unit 153 counts up the total of search results in accordance with the output pattern, generates information on a display screen from a result of the counting or the like, and outputs information on the generated display screen to the display unit 130.

Next, examples of a question sentence and an output image will be described. FIG. 5 to FIG. 10 are diagrams illustrating examples of the question sentence and the output image.

Figure 5:
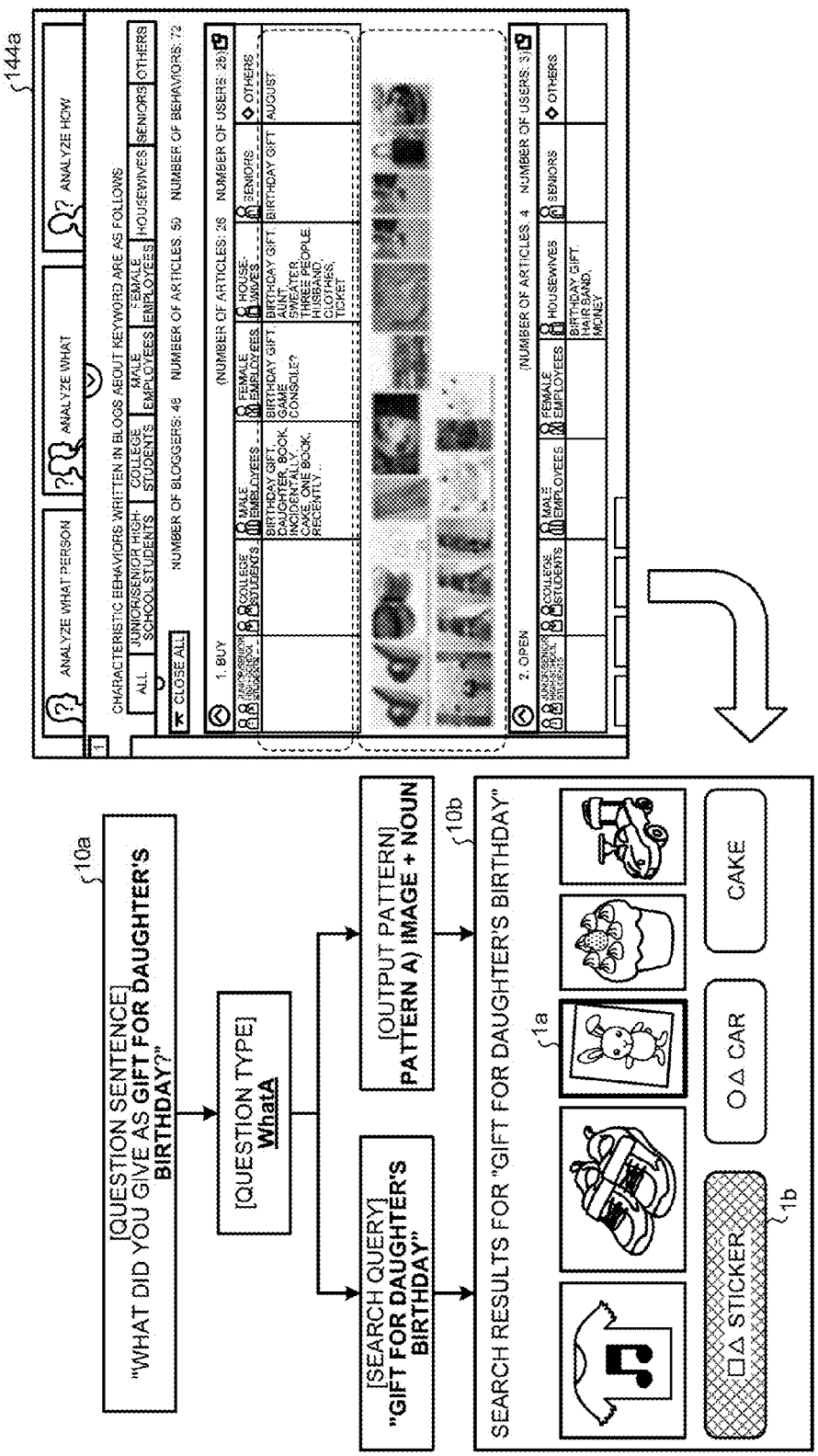
FIG. 5 is a diagram illustrating a first example of a question sentence and an output image.

FIG. 5 will be described. The receiving unit 151 receives a question sentence 10*a*. As one example, it is assumed that the question sentence 10*a* is "What did you give as a gift for daughter's birthday?". The determining unit 152 determines a question type, an output pattern, and a search query on the basis of the question sentence 10*a*, the question phrase dictionary 141, and the extraction rule information 142. For example, the determining unit 152 determines that the question type is "WhatA", the output pattern is "image+ noun", and the search query is "a gift for daughter's birthday". It is assumed here that the extraction rule is "noun before interrogative".

The determining unit 152 extracts information corresponding to the search query from the DB 144. A symbol 144*a* on the right side in FIG. 5 indicates an example of the information extracted with respect to the search query of "a gift for daughter's birthday" from the DB 144. As indicated by 144*a*, the extracted information contains, for example, information indicating an article, information on a photograph, and the like. The output unit 153 generates a display screen 10*b* in a display mode corresponding to the output pattern of "image+noun". For example, in the example illustrated in FIG. 5, an image 1*a* and a noun 1*b* are associated with each other. For example, the output unit 153 displays the display screen 10*b* on the display unit 130, and upon selection of an image by a user, may display a noun associated with the image in a highlighted manner. Further, the output unit 153 displays the display screen 10*b* on the display unit 130, and upon selection of a noun by a user, may display an image associated with the noun in a highlighted manner.

The output unit 153 is able to associate a noun with an image in an arbitrary manner. For example, it may be possible to associate a noun and an image in an article corresponding to the same user identification information in the DB 144.

Further, the output unit 153 may associate an image and a noun with each other, and display a set of the image and the noun in the form of ranking. For example, the output unit 153 ranks the image and the noun according to the number of hits.

Figure 6:
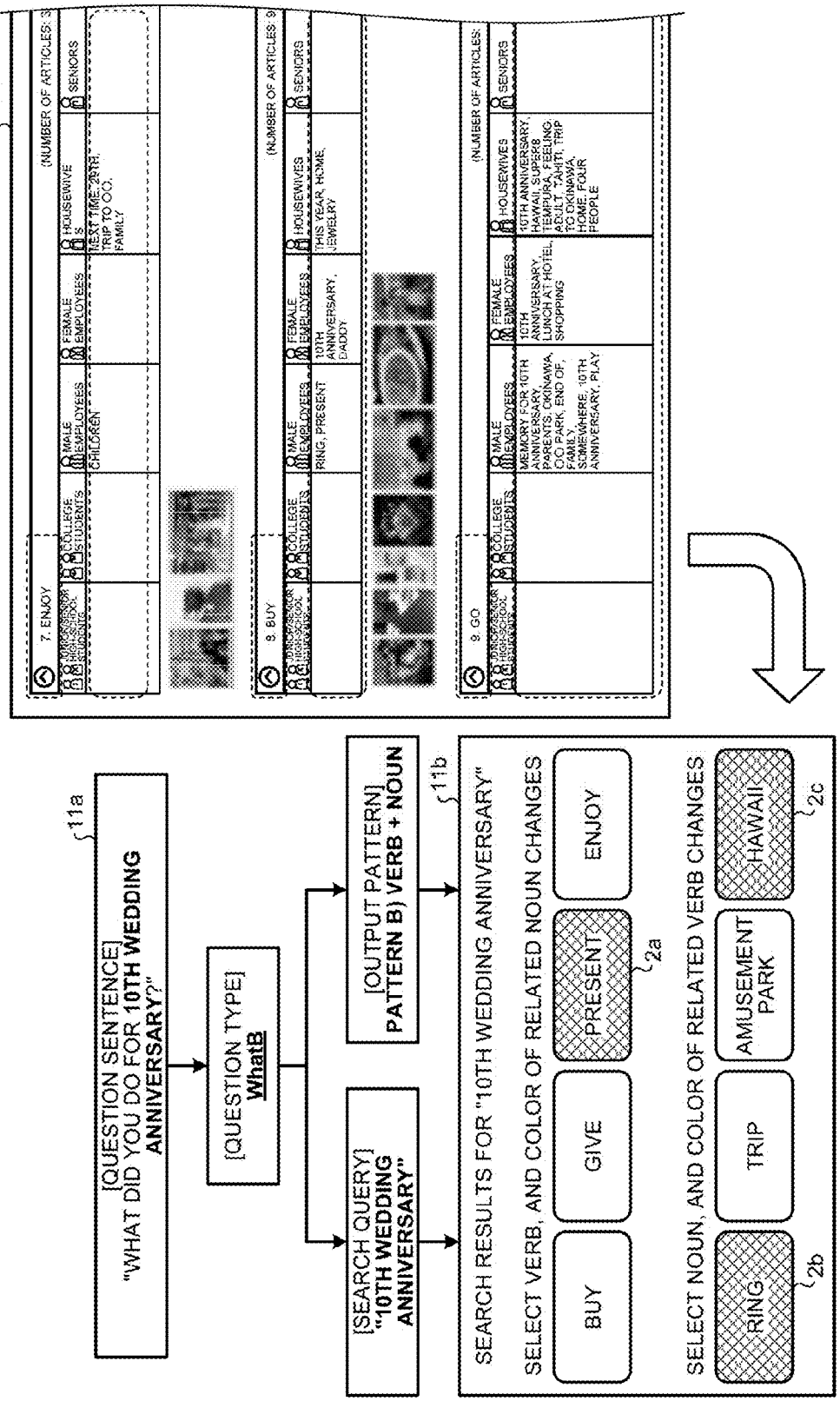
FIG. 6 is a diagram illustrating a second example of the question sentence and the output image.

FIG. 6 will be described. The receiving unit 151 receives a question sentence 11*a*. As one example, it is assumed that the question sentence 11*a* is "What did you do for 10$^{th}$ wedding anniversary?". The determining unit 152 determines a question type, an output pattern, and a search query on the basis of the question sentence 11*a*, the question phrase dictionary 141, and the extraction rule information 142. For example, the determining unit 152 determines that the question type is "WhatB", the output pattern is "verb+ noun", and the search query is "10$^{th}$ wedding anniversary". It is assumed here that the extraction rule is "noun and verb before interrogative". In the question sentence 11*a*, only a noun is present before an interrogative. Therefore, the determining unit 152 determines the noun as a search query.

The determining unit 152 extracts information corresponding to the search query from the DB 144. A symbol 144*b* on the right side in FIG. 6 indicates an example of the information extracted with respect to the search query of "10$^{th}$ wedding anniversary" from the DB 144. The output unit 153 generates a display screen 11*b* in a display mode corresponding to the output pattern of "verb+noun". For example, in the example illustrated in FIG. 6, a verb 2*a* and nouns 2*b* and 2*c* are associated with one another. For example, the output unit 153 displays the display screen 11*b* on the display unit 130, and upon selection of a verb by a user, may display a noun associated with the verb in a highlighted manner. Further, the output unit 153 displays the display screen 11*b* on the display unit 130, upon selection of a noun by a user, may display a verb associated with the noun in a highlighted manner.

The output unit 153 is able to associate a verb with a noun in an arbitrary manner. For example, it may be possible to associate a verb and a noun in an article corresponding to the same user identification information in the DB 144.

Figure 7:
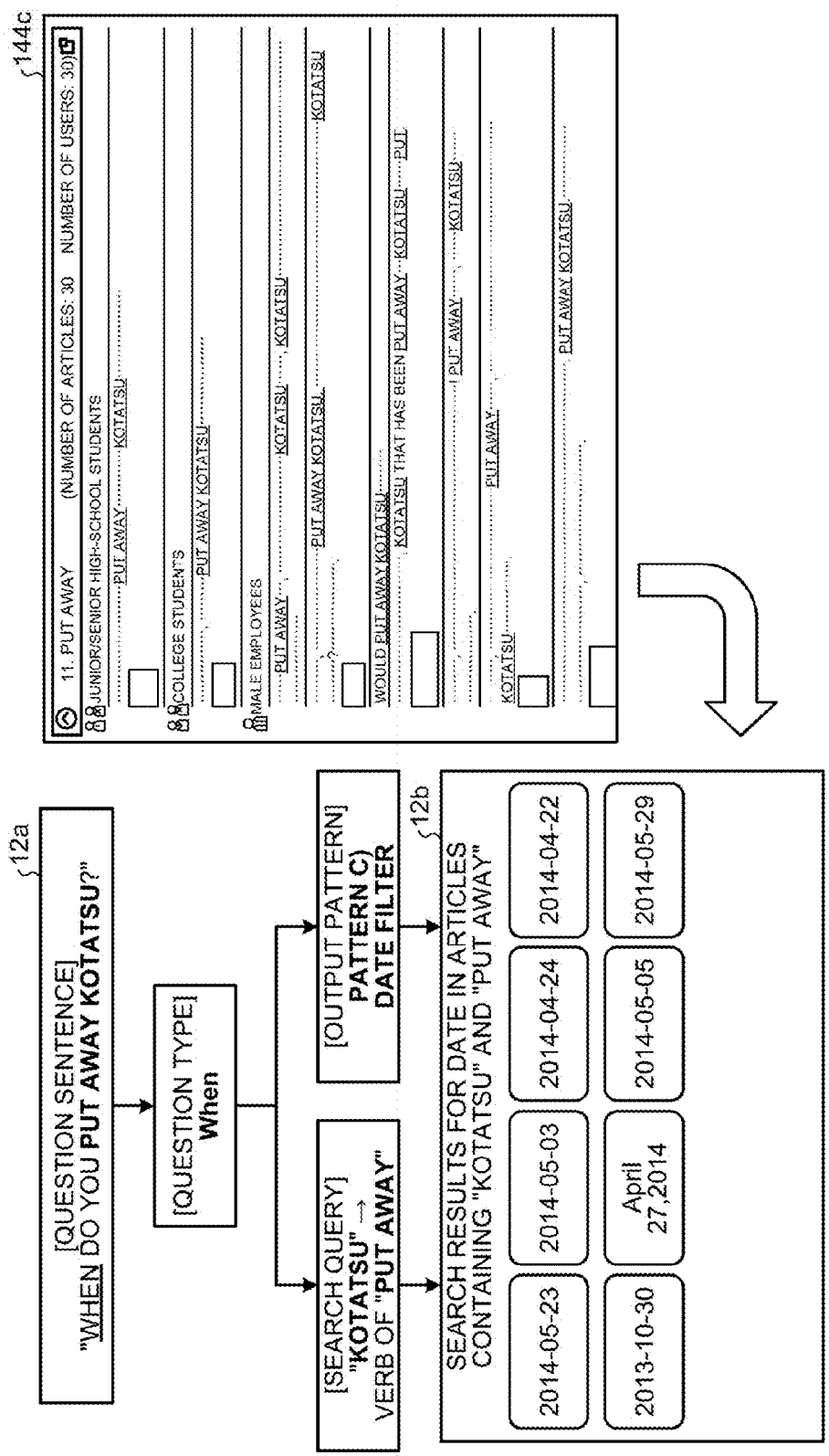
FIG. 7 is a diagram illustrating a third example of the question sentence and the output image.

FIG. 7 will be described. The receiving unit 151 receives a question sentence 12*a*. As one example, it is assumed that the question sentence 12*a* is "When do you put away kotatsu?". The determining unit 152 determines a question type, an output pattern, and a search query on the basis of the question sentence 12*a*, the question phrase dictionary 141, and the extraction rule information 142. For example, the determining unit 152 determines that the question type is "When", the output pattern is "date", and the search query is "put away". It is assumed here that the extraction rule is "verbs before and after interrogative". In the question sentence 12*a*, a verb is present only after an interrogative. Therefore, the determining unit 152 determines the verb as a search query.

The determining unit 152 extracts information corresponding to the search query from the DB 144. A symbol 144*c* on the right side in FIG. 7 indicates an example of the information extracted with respect to the search query of "kotatsu" and "put away" from the DB 144. The output unit 153 generates a display screen 12*b* in a display mode corresponding to the output pattern of "date filter". For example, when the output pattern is "date filter", the output unit 153 sets dates contained in articles in search results on the display screen 12*b*.

Figure 8:
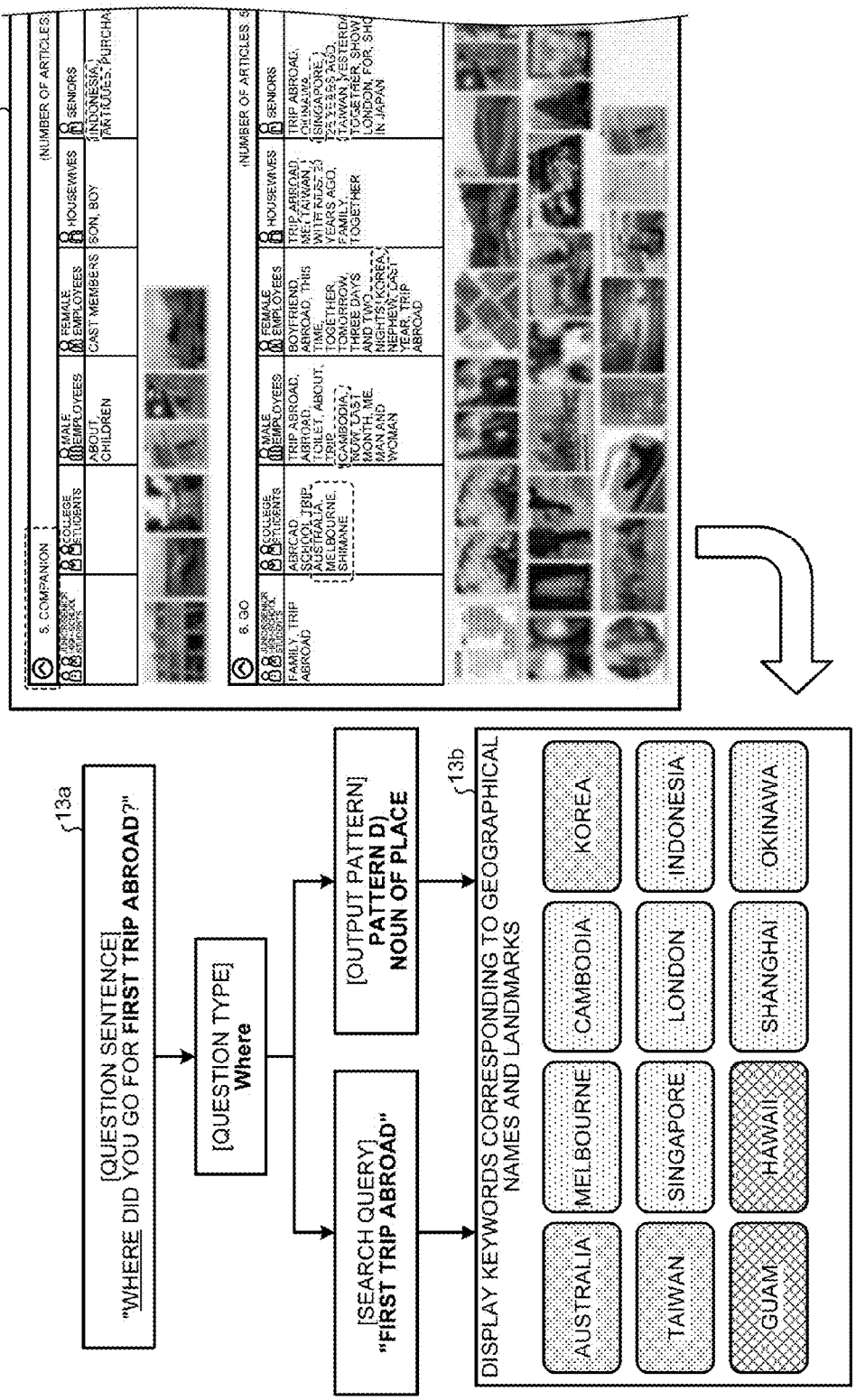
FIG. 8 is a diagram illustrating a fourth example of the question sentence and the output image.

FIG. 8 will be described. The receiving unit 151 receives a question sentence 13*a*. As one example, it is assumed that the question sentence 13*a* is "Where did you go for first trip abroad?". The determining unit 152 determines a question type, an output pattern, and a search query on the basis of the question sentence 13*a*, the question phrase dictionary 141, and the extraction rule information 142. For example, the determining unit 152 determines that the question type is "Where", the output pattern is "noun indicating place", and the search query is "first trip abroad". It is assumed here that the extraction rule is "noun before interrogative".

The determining unit 152 extracts information corresponding to the search query from the DB 144. A symbol 144*d* on the right side in FIG. 8 indicates an example of the information extracted with respect to the search query of "first trip abroad" from the DB 144. The output unit 153 generates a display screen 13*b* in a display mode corresponding to the output pattern of "noun indicating place". For example, when the output pattern is "noun indicating place", the output unit 153 sets a geographical name, a landmark, a store name, and a brand name contained in articles in search results, as names of places on the display screen 13*b*. Further, the output unit 153 may change the way to display a name of a place among names of places contained in the search results, depending on the number of hits. For example, the output unit 153 may display a name of a place by using a darker color as the number of hits increases.

Further, when displaying the geographical name, the landmark, the store name, and the brand name contained in the articles in the search results, the output unit 153 may search for places on a map associated with the geographical name, the landmark, the store, and the brand, and display the places, which are obtained by the search, on the map.

Figure 9:
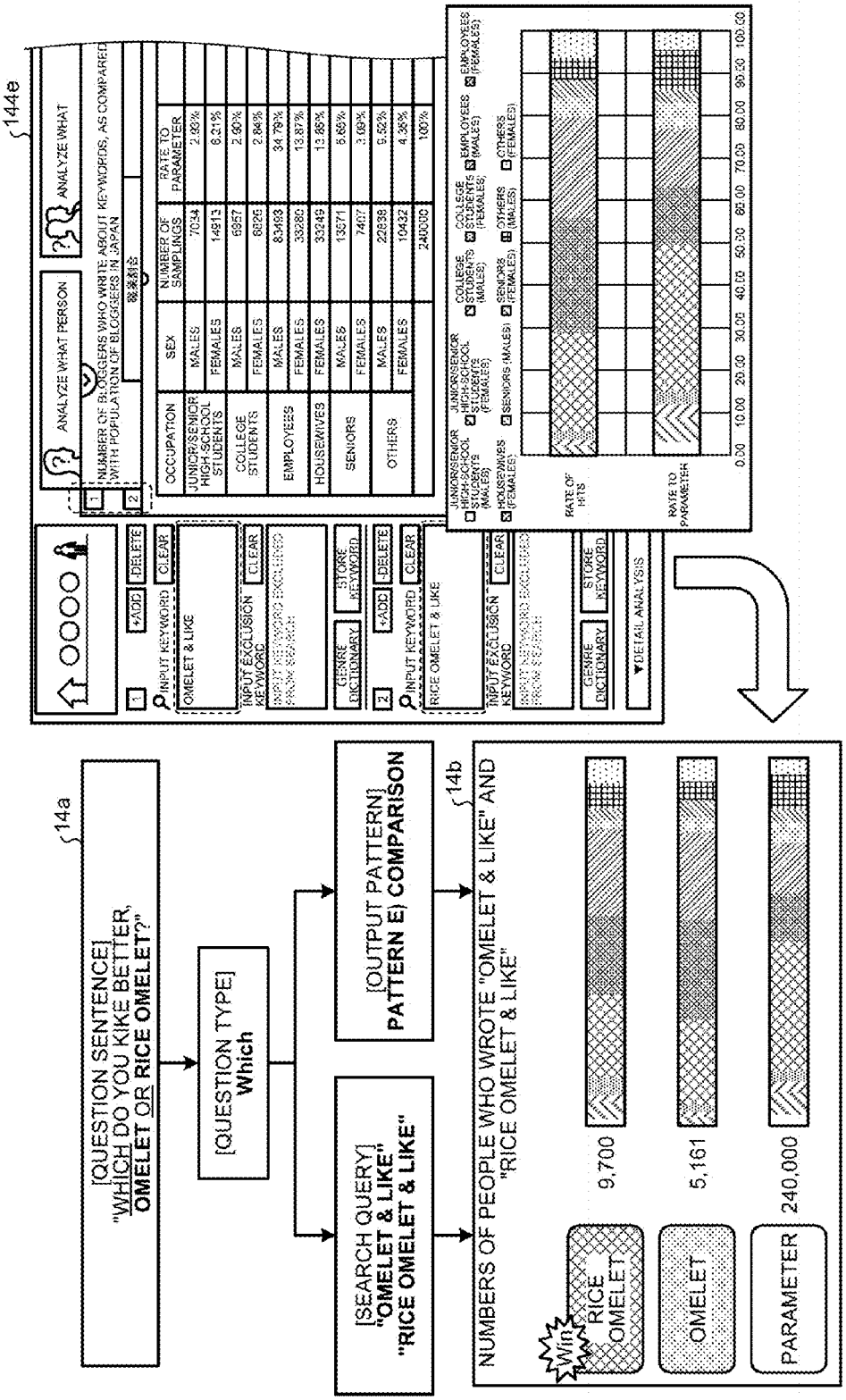
FIG. 9 is a diagram illustrating a fifth example of the question sentence and the output image.

FIG. 9 will be described. The receiving unit 151 receives a question sentence 14*a*. As one example, it is assumed that the question sentence 14*a* is "Which do you like better, omelet or rice omelet?". The determining unit 152 determines a question type, an output pattern, and a search query on the basis of the question sentence 14*a*, the question phrase dictionary 141, and the extraction rule information 142. For example, the determining unit 152 determines that the question type is "Which", the output pattern is "comparison", and the search queries are "omelet & like" and "rice omelet & like". It is assumed here that the extraction rule is "noun and verb before and after interrogative".

The determining unit 152 extracts information corresponding to the search query from the DB 144. A symbol 144*e* on the right side in FIG. 9 indicates an example of the information extracted with respect to the search queries of "omelet & like" and "rice omelet & like" from the DB 144. The output unit 153 generates a display screen 14*b* in a graph display mode specified by the output pattern of "comparison", in which the numbers of people corresponding to the respective search queries are compared with each other. For example, when the output pattern is "comparison", the output unit 153 counts up the total number of people who write keywords of "omelet" and "like" and the number of people who write keywords of "rice omelet" and "like" in the search results. The output unit 153 determines that the number of people who write keywords of "omelet" and "like" is "9700" and the number of people who write keywords of "rice omelet" and "like" is "5161" based on a result of the counting, and generates the display screen 14*b*. In this manner, when the question type is "Which", the output unit 153 displays a noun, which is to be a comparison object, in a display mode that enables comparison.

A parameter contained in the display screen 14*b* in FIG. 9 is, for example, the number of users contained in the DB 144. The output unit 153 may additionally display information on the parameter on the display screen 14*b*. Further, the output unit 153 may additionally display a rate of each attribute with respect to the number of people who write keywords of "omelet" and "like". Similarly, the output unit 153 may additionally display a rate of each attribute with respect to the number of people who write keywords of "rice omelet" and "like".

Figure 10:
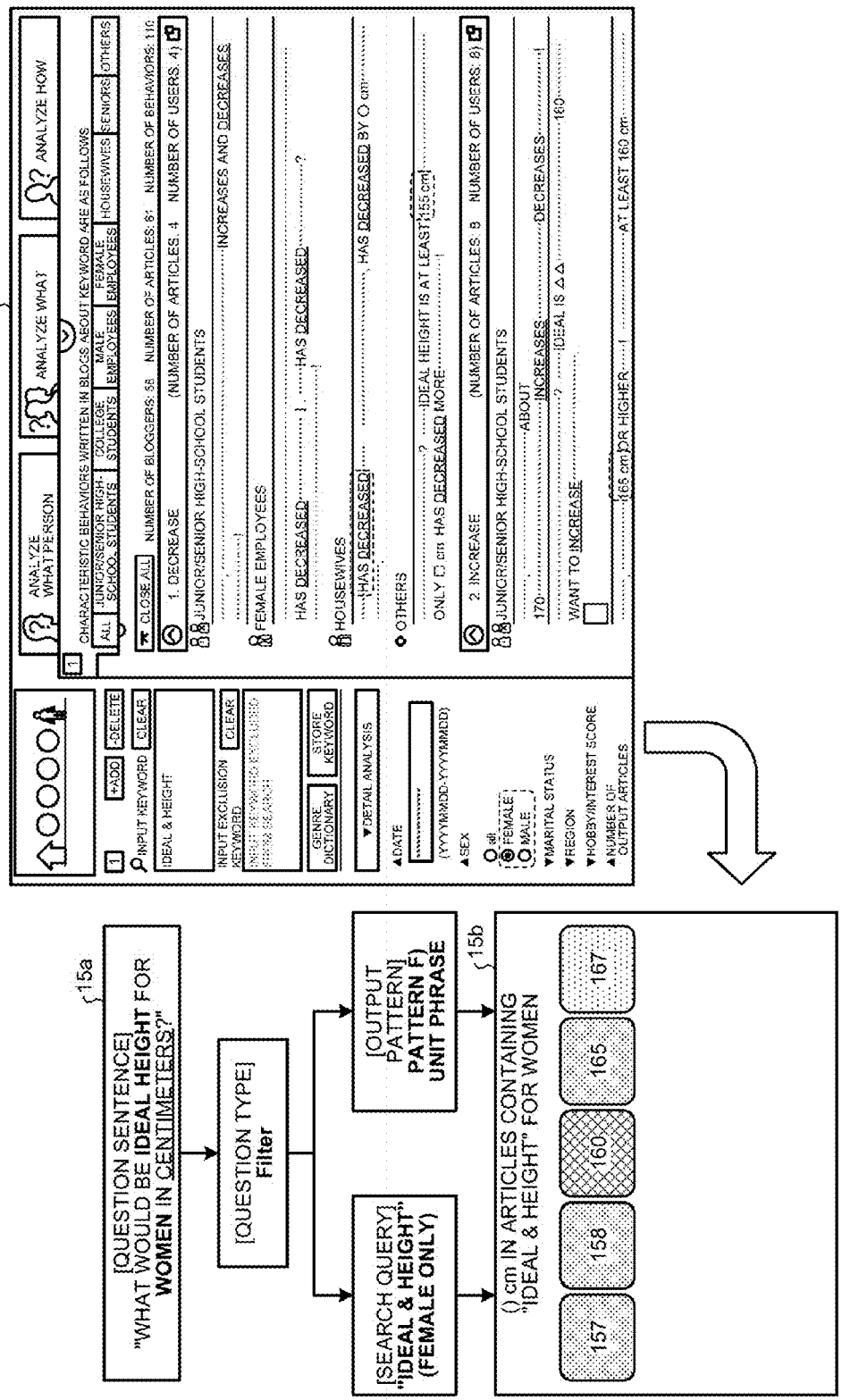
FIG. 10 is a diagram illustrating a sixth example of the question sentence and the output image.

FIG. 10 will be described. The receiving unit 151 receives a question sentence 15*a*. As one example, the question sentence 15*a* is assumed as "What would be an ideal height for women in centimeters?". The determining unit 152 determines a question type, an output pattern, and a search query on the basis of the question sentence 15*a*, the question phrase dictionary 141, and the extraction rule information 142. For example, the determining unit 152 determines that the question type is "Filter", the output pattern is "unit phrase", and the search query is "ideal & height (female only)". It is assumed here that the extraction rule is "noun before interrogative".

The determining unit 152 extracts information corresponding to the search query from the DB 144. A symbol 144*f* on the right side in FIG. 10 indicates an example of the information extracted with respect to the search query of "ideal & height (female only)" from the DB 144. The output unit 153 generates a display screen 15*b* in a display mode corresponding to the output pattern of "unit phrase". For example, when the output pattern is "unit phrase", the output unit 153 sets numerals before "cm" contained in articles in search results on the display screen 15*b*. Further, the determining unit 152 counts up the total number of each numeral extracted from the articles, and change the way to display the numerals depending on the total number. For example, the output unit 153 may display a numeral by using a darker color as the total number of the numeral increases.

In the example illustrated in FIG. 10, "cm" is described as an example of a unit; however, the unit is not limited to "cm".

FIG. 11 is a diagram illustrating an example of various units. In the example illustrated in FIG. 11, a filter type, a specific example, and a unit are associated with one another. The filter type corresponds to, for example, the question type of "Filter" illustrated in FIG. 3A and FIG. 3B, and a different filter may be set for each unit. The specific example is an example of a meaning of a numeral to which a unit is assigned. The unit is an example of a unit applicable to the disclosed technology, in addition to the unit of cm as described above.

Figure 12:
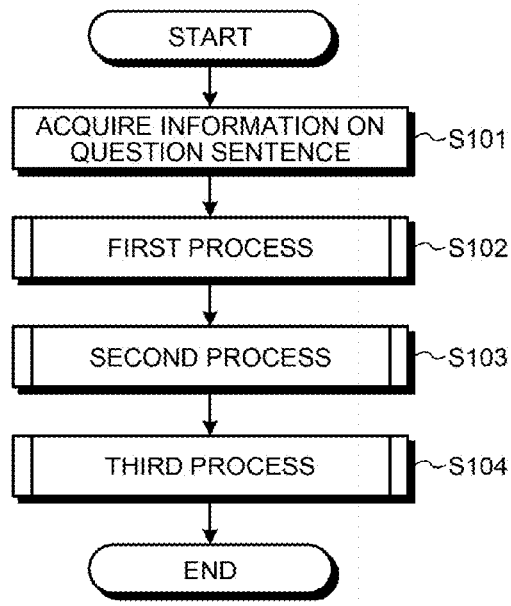
FIG. 12 is a flowchart illustrating the flow of a process performed by the search support apparatus according to the embodiment.

Next, an example of the flow of a process performed by the search support apparatus 100 according to the embodiment will be described. FIG. 12 is a flowchart illustrating the flow of a process performed by the search support apparatus according to the embodiment. As illustrated in FIG. 12, the receiving unit 151 of the search support apparatus 100 acquires information on a question sentence (Step S101).

The determining unit 152 of the search support apparatus 100 performs a first process (Step S102). The determining unit 152 performs a second process (Step S103). The determining unit 152 performs a third process (Step S104).

Figure 13:
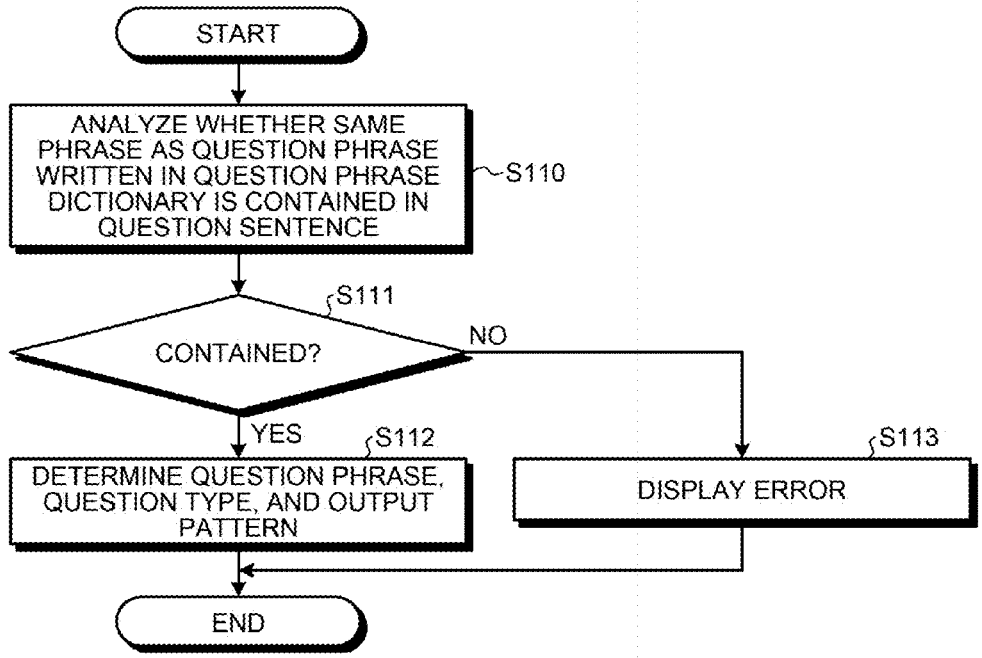
FIG. 13 is a flowchart illustrating the flow of a first process.

The flow of the first process at Step S102 illustrated in FIG. 12 will be described below. FIG. 13 is a flowchart illustrating the flow of the first process. As illustrated in FIG. 13, the determining unit 152 of the search support apparatus 100 analyzes whether the same phrase as a question phrase written in the question phrase dictionary 141 is contained in a question sentence (Step S110).

If the same phrase as a question phrase written in the question phrase dictionary 141 is contained (YES at Step S111), the determining unit 152 determines a question phrase, a question type, and an output pattern (Step S112), and terminates the first process.

In contrast, if the same phrase as a question phrase written in the question phrase dictionary 141 is not contained (NO at Step S111), the determining unit 152 displays an error (Step S113), and terminates the process. Meanwhile, the determining unit 152 may request information on a question sentence again after displaying the error, and upon input of the information on the question sentence, may perform the process at Step S110 again.

Figure 14:
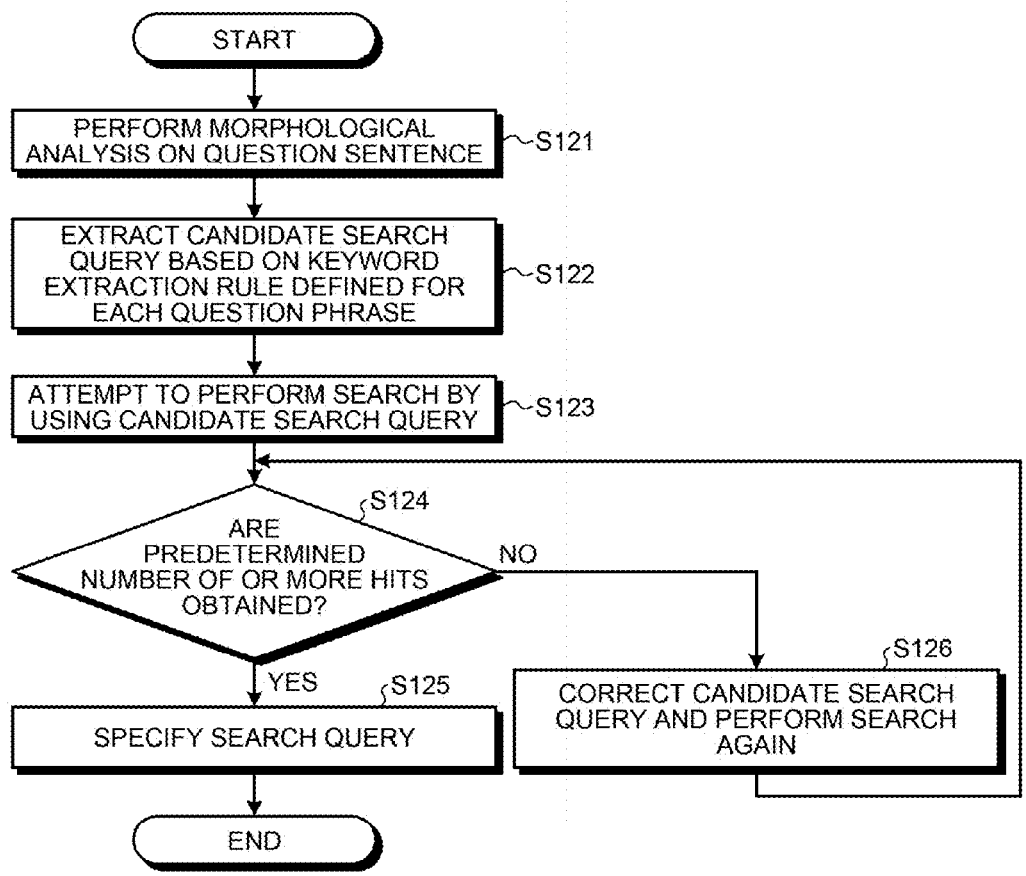
FIG. 14 is a flowchart illustrating the flow of a second process.

The flow of the second process at Step S103 illustrated in FIG. 12 will be described below. FIG. 14 is a flowchart illustrating the flow of the second process. As illustrated in FIG. 14, the determining unit 152 of the search support apparatus 100 performs morphological analysis on the question sentence (Step S121), and extracts a candidate search query on the basis of a keyword extraction rule defined for each question phrase (Step S122).

The determining unit 152 attempts to perform a search by using the candidate search query (Step S123), and determines whether a predetermined number of or more hits are obtained (Step S124). If the predetermined number of or more hits are obtained (YES at Step S124), the determining unit 152 specifies a search query (Step S125), and terminates the second process.

In contrast, if the predetermined number of or more hits are not obtained (NO at Step S124), the determining unit 152 corrects the candidate search query and performs a search again (Step S126), and the process proceeds to Step S124.

Figure 15:
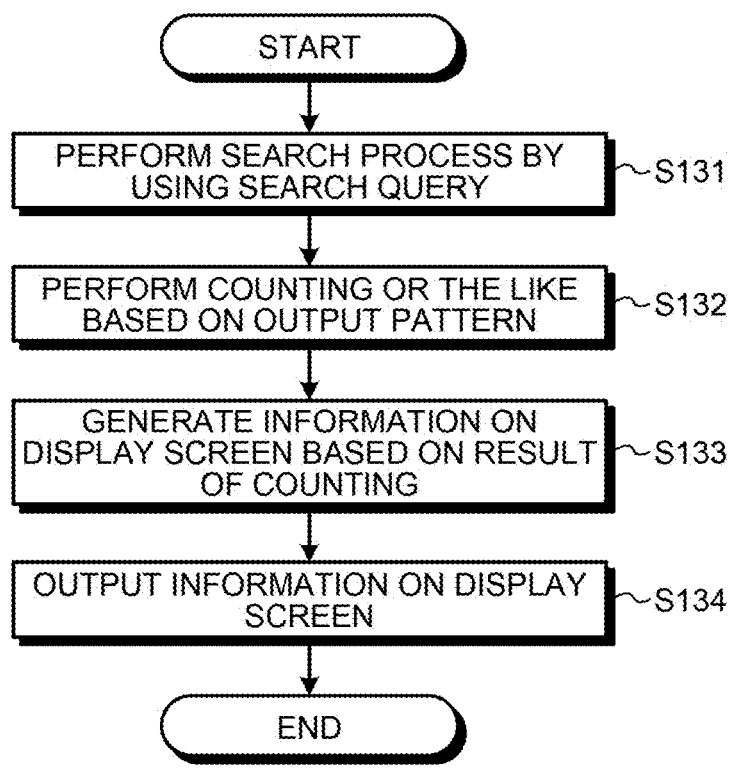
FIG. 15 is a flowchart illustrating the flow of a third process.

The flow of the third process at Step S104 illustrated in FIG. 12 will be described below. FIG. 15 is a flowchart illustrating the flow of the third process. As illustrated in FIG. 15, the determining unit 152 of the search support apparatus 100 performs a search process by using the search query (Step S131).

The output unit 153 of the search support apparatus 100 performs counting or the like on the basis of the output pattern (Step S132). The output unit 153 generates information on a display screen on the basis of a result of the counting (Step S133). The output unit 153 outputs the information on the display screen (Step S134).

Next, advantageous effects of the search support apparatus 100 according to the embodiment will be described. The search support apparatus 100 extracts a search query and a question type from a character string contained in a question sentence, determines an output pattern on the basis of the question type, and outputs a search result by the search query in a display mode corresponding to the output pattern. Therefore, according to the search support apparatus 100, it is possible to return a response in a mode corresponding to the question sentence.

If the question type of a question sentence is to request a response in which one of question objects is selectable, the search support apparatus 100 specifies selection objects from the search query. Then, the search support apparatus 100 outputs search/analysis results for each of the specified selection objects in a mode that enables comparison. Therefore, according to the search support apparatus 100, it is possible to return a response in a mode corresponding to the question sentence. For example, a user is able to refer to a result of comparison between comparison objects by only inputting a question sentence related to comparison.

If the question type of a question sentence is to request a response in which search results are listed, the search support apparatus 100 extracts search objects from a search query, and outputs the extracted search objects in the form of a list. Therefore, according to the search support apparatus 100, it is possible to return a response in a mode corresponding to the question sentence. For example, a user is able to refer to information in which search objects are listed, and easily find a desired search object by only inputting a question sentence.

If the question type of a question sentence is to request a response in which search results are listed, the search support apparatus 100 extracts search objects from a search query, and displays the extracted search objects in the form of ranking based on a predetermined criterion. Therefore, according to the search support apparatus 100, it is possible to return a response in a mode corresponding to the question sentence. For example, a user is able to refer to a desired search object in the form of ranking, and efficiently select a search object for each purpose according to the ranking by only inputting a question sentence.

If the question type of a question sentence is to request a response on a place of an object, the search support apparatus 100 extracts a search object from a search query, and displays a place of the extracted search object in a mode in which the place is displayed on a map. Therefore, according to the search support apparatus 100, it is possible to return a response in a mode corresponding to the question sentence. For example, a user is able to check not only a place of a search object but also a location of the place on the map by only inputting a question sentence.

Figure 16:
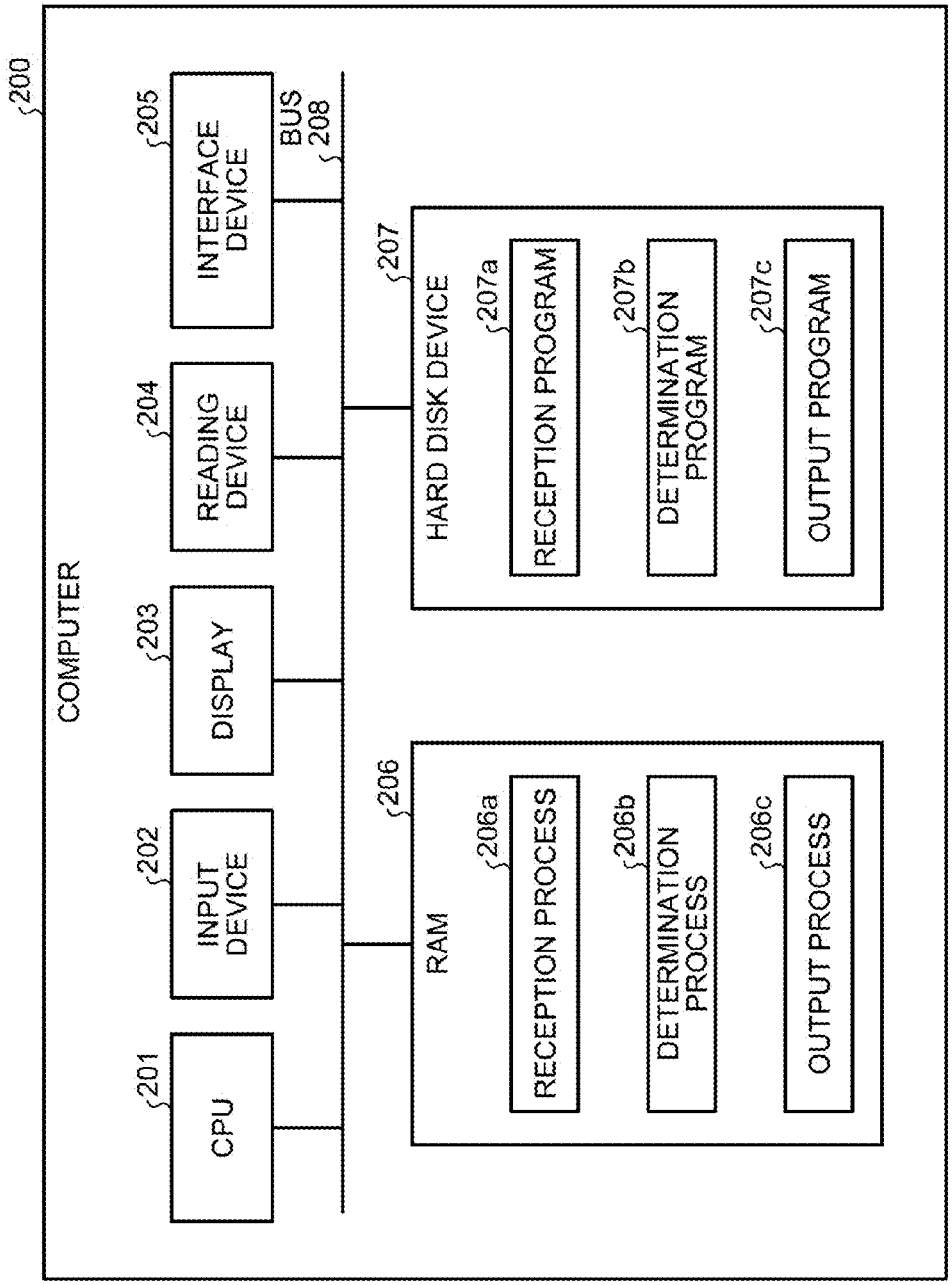
FIG. 16 is a diagram illustrating an example of a computer that executes a search support program.

Next, a computer that executes a search support program for realizing the same functions as those of the search support apparatus 100 illustrated in the above described embodiment will be described. FIG. 16 is a diagram illustrating an example of the computer that executes the search support program.

As illustrated in FIG. 16, a computer 200 includes a CPU 201 that performs various kinds of arithmetic processing, an input device 202 that receives input of data from a user, and a display 203. The computer 200 further includes a reading device 204 that reads a program or the like from a storage medium, and an interface device 205 that sends and receives data to and from other computers via a network. The computer 200 further includes a RAM 206 for temporarily storing various kinds of information, and a hard disk device 207. Each of the devices 201 to 207 are connected to a bus 208.

The hard disk device 207 includes a reception program 207a, a determination program 207b, and an output program 207c. The CPU 201 reads the reception program 207a, the determination program 207b, and the output program 207c, and loads the programs on the RAM 206. The reception program 207a functions as a reception process 206a. The determination program 207b functions as a determination process 206b. The output program 207c functions as an output process 206c. For example, processes in the reception process 206a correspond to the processes performed by the receiving unit 151. Processes in the determination process 206b correspond to the processes performed by the determining unit 152. Processes in the output process 206c correspond to the processes performed by the output unit 153.

According to one embodiment of the disclosed technology, it is possible to output a response in a mode corresponding to a question sentence.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process comprising:
   receiving a question containing a character string;
   identifying a question phrase for specifying a question type of the received question by comparing the character string contained in the question and a question phrase that is included in information that is stored in a storage unit, in the stored information a question phrase, a display mode and an extraction rule being associated one another, and identifying, based on the extraction rule that is associated with the identified question phrase, a search query used for searching in a database for a response to the received question, the database storing information published on Web sites;

determining a display mode of an output of the response to the received question in accordance with the identified question phrase for specifying the question type by referring to the stored information; and outputting a search result of searching in the database using the identified search query, in the display mode of the output, wherein the process further comprises specifying, when the identified question phrase indicates that selection from objects that are included in the question is requested, the objects for selection and information related thereto from the search result;

outputting each of the specified objects and information, in a display mode that enables comparison therebetween;

extracting, when the identified question phrase indicates that objects of an action that is specified in the question are requested to be searched, the objects from the search result; and outputting the extracted objects in a display mode in which images of the extracted objects are listed.

2. The non-transitory computer-readable recording medium according to claim 1, the process further comprising:

extracting, when the identified question phrase indicates that listing of objects to be searched by the question is requested, the objects from the search result; and outputting the extracted objects in a form of a list.

3. The non-transitory computer-readable recording medium according to claim 1, the process further comprising:

extracting, when the identified question phrase indicates that listing of candidates for an object to be searched by the question is requested, the candidates from the search result; and displaying the extracted candidates in a form of ranking based on a predetermined criterion.

4. The non-transitory computer-readable recording medium according to claim 1, the process further comprising:

extracting, when the identified question phrase indicates that a place of an object is requested to be searched, the object from the search result; and displaying the place of the extracted object in a display mode in which the place is displayed on a map.

5. The non-transitory computer-readable recording medium according to claim 1, wherein the outputting includes outputting the extracted objects in a display mode in which images and nouns that respectively correspond to the images are listed.

6. A search support method performed by a computer, the search support method comprising:

receiving a question containing a character string;

identifying a question phrase for specifying a question type of the received question by comparing the character string contained in the question and a question phrase that is included in information that is stored in a storage unit, in the stored information a question phrase, a display mode and an extraction rule being associated one another, and identifying, based on the extraction rule that is associated with the identified question phrase, a search query used for searching in a database for a response to the received question, the database storing information published on Web sites;

determining a display mode of an output of the response to the received question in accordance with the identified question phrase for specifying the question type by referring to the stored information; and outputting a search result of searching in the database using the identified search query, in the display mode of the output, wherein the process further comprises specifying, when the identified question phrase indicates that selection from objects that are included in the question is requested, the objects for selection and information related thereto from the search result;

outputting each of the specified objects and information, in a display mode that enables comparison therebetween;

extracting, when the identified question phrase indicates that objects of an action that is specified in the question are requested to be searched, the objects from the search result; and outputting the extracted objects in a display mode in which images of the extracted objects are listed.

7. The search support method according to claim 6, further comprising:

extracting, when the identified question phrase indicates that listing of objects to be searched by the question is requested, the objects from the search result; and outputting the extracted objects in a form of a list.

8. The search support method according to claim 6, further comprising:

extracting, when the identified question phrase indicates that listing of candidates for an object to be searched by the question is requested, the candidates from the search result; and displaying the extracted candidates in a form of ranking based on a predetermined criterion.

9. The search support method according to claim 6, further comprising:

extracting, when the identified question phrase indicates that a place of an object is requested to be searched, the object from the search result; and displaying the place of the extracted object in a display mode in which the place is displayed on a map.

10. The search support method according to claim 6, further comprising:

extracting, when the identified question phrase indicates that actions are requested to be searched, the actions from the search result; and outputting the extracted actions in a display mode in which character strings respectively indicating contents of the actions are listed.

11. The search support method according to claim 6, further comprising:

extracting, when the identified question phrase indicates that comparison between a plurality of objects included in the question is requested, the objects and information related thereto from the search result, and performing a predetermined common analysis on each of the extracted objects based on the information; and outputting a result of the performed analysis in a display mode in which comparison is possible.

12. A search support apparatus comprising:
a processor that executes a process including:
receiving a question containing a character string;
identifying a question phrase for specifying a question type of the received question by comparing the character string contained in the question and a question phrase that is included in information that is stored in a storage unit, in the stored information a question phrase, a display mode and an extraction rule being associated one another, and identifying, based on the extraction rule that is associated with the identified question phrase, a search query used for searching in a database for a response to the received question, the database storing information published on Web sites;
determining a display mode of an output of the response to the received question in accordance with the identified question phrase for specifying the question type by referring to the stored information; and
outputting a search result of searching in the database using the identified search query, in the display mode of the output, wherein the process further comprises
specifying, when the identified question phrase indicates that selection from objects that are included in the question is requested, the objects for selection and information related thereto from the search result;
outputting each of the specified objects and information, in a display mode that enables comparison therebetween;
extracting, when the identified question phrase indicates that objects of an action that is specified in the question are requested to be searched, the objects from the search result; and
outputting the extracted objects in a display mode in which images of the extracted objects are listed.

13. The search support apparatus according to claim 12, wherein the process further comprising:
extracting, when the identified question phrase indicates that listing of objects to be searched by the question is requested, the objects from the search result; and
outputting the extracted objects in a form of a list.

14. The search support apparatus according to claim 12, wherein the process further comprising:
extracting, when the identified question phrase indicates that listing of candidates for an object to be searched by the question is requested, the candidates from the search result; and
displaying the extracted candidates in a form of ranking based on a predetermined criterion.

15. The search support apparatus according to claim 12, wherein the process further comprising:
extracting, when the identified question phrase indicates that a place of an object is requested to be searched, the object from the search result; and
displaying the place of the extracted object in a display mode in which the place is displayed on a map.

* * * * *